United States Patent
Habassi et al.

(10) Patent No.: US 8,153,263 B2
(45) Date of Patent: Apr. 10, 2012

(54) OPTICAL ARTICLE COMPRISING AN EXTERNAL WATER- AND/OR OIL-REPELLENT COATING COATED WITH A TEMPORARY COATING

(75) Inventors: Chefik Habassi, Charenton le Pont (FR); Leang Ly, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 558 days.

(21) Appl. No.: 12/302,670

(22) PCT Filed: May 22, 2007

(86) PCT No.: PCT/FR2007/051310
§ 371 (c)(1),
(2), (4) Date: Nov. 26, 2008

(87) PCT Pub. No.: WO2007/138215
PCT Pub. Date: Dec. 6, 2007

(65) Prior Publication Data
US 2009/0155582 A1    Jun. 18, 2009

(30) Foreign Application Priority Data
May 26, 2006    (FR) ...................................... 06 51923

(51) Int. Cl.
*B32B 27/40*    (2006.01)

(52) U.S. Cl. .................................................... 428/423.1

(58) Field of Classification Search ................ 428/423.1
See application file for complete search history.

(56) References Cited

U.S. PATENT DOCUMENTS

| | | | |
|---|---|---|---|
| 6,187,444 B1 | 2/2001 | Bowles, III et al. ........ 428/423.1 |
| 6,250,512 B1 | 6/2001 | Salamon ........................ 222/402 |
| 7,629,053 B2 * | 12/2009 | Lacan et al. .................... 428/432 |
| 2005/0115923 A1 * | 6/2005 | Lacan et al. ...................... 216/26 |
| 2008/0023137 A1 * | 1/2008 | Jiang et al. ..................... 156/344 |
| 2010/0096602 A1 * | 4/2010 | Mosse et al. ................... 252/586 |

FOREIGN PATENT DOCUMENTS

| | | |
|---|---|---|
| WO | WO 98/37115 | 8/1998 |
| WO | WO 00/68326 | 11/2000 |
| WO | WO 01/02496 | 1/2001 |
| WO | WO 02/092524 | 11/2002 |
| WO | WO 03/057641 | 7/2003 |
| WO | WO 2004/110946 | 12/2004 |
| WO | WO 2005/015270 | 2/2005 |

OTHER PUBLICATIONS

International Search Report, issued in Int. App. No. PCT/FR2007/051310, mail date Sep. 26, 2007.

* cited by examiner

*Primary Examiner* — Thao T. Tran
(74) *Attorney, Agent, or Firm* — Fulbright & Jaworski L.L.P.

(57) ABSTRACT

The present invention relates to an optical article comprising on one of the main surfaces thereof an external water- and/or oil-repellent coating, characterized in that a temporary coat of a dried polyurethane latex-based composition is directly deposited onto the external water- and/or oil-repellent coating.

21 Claims, No Drawings

OPTICAL ARTICLE COMPRISING AN EXTERNAL WATER- AND/OR OIL-REPELLENT COATING COATED WITH A TEMPORARY COATING

This application is a national phase application under 35 U.S.C. §371 of International Application No. PCT/FR2007/051310 filed 22 May 2007, which claims priority to French Application No. 0651923 filed 26 May 2006. The entire text of each of the above-referenced disclosures is specifically incorporated herein by reference without disclaimer.

The field of the present invention generally relates to optical articles, especially to ophthalmic lenses, provided with an external coating having water- and/or oil-repellent properties (top coat).

Such external water- and/or oil-repellent coatings are well known in the art.

The aim of such external water- and/or oil-repellent coatings, which are typically associated with antireflective coatings, is to prevent the ophthalmic lens from getting dirty. It is most of the time a material of the fluorosilane type, which reduces the surface energy so as to prevent greasy soils from adhering, thus making it easier to remove.

One of the problems arising from those external water- and/or oil-repellent coatings lies in the efficiency they do reach, to the point of impairing or even compromising adhesion at the interface between an adhesive pad and the surface of the water- and/or oil-repellent coating that is required for mounting lenses during an edging operation.

Edging is the last finishing step for an ophthalmic lens and does consist in machining the edge or the periphery of the lens so as to conform it to the size and shape required for adapting the lens to the spectacle frame into which it is intended to be inserted.

Edging is performed on an automated grinder comprising diamond grinding wheels which carry out the hereabove defined machining and the lens to be edged has thus to be fixedly maintained in the grinder.

For this purpose, the first stage does consist in fixing a clamping device in the middle of the convex surface of the lens by means of an adhesive pad such as a double-sided adhesive pad.

The clamping device to which the lens does adhere through said adhesive pad is then mechanically fixed along the mounting axis of the grinder and an axial arm is blocking the lens by applying a central force on the lens side opposite to the clamping device.

Upon edging, the lens should not undergo any offset of more than 2°, preferably of maximum 1°, and therefore the pad adhesion to the lens surface is crucial for a good edging.

To overcome these difficulties in edging lenses that are provided with an external water- and/or oil-repellent coating, it has been proposed to form on such water- and/or oil-repellent coatings a temporary coating of organic or mineral nature. For example, the European patent applications EP 1 392 613 and EP 1 633 684, in the name of ESSILOR, describe the use of a temporary coating of organic or mineral nature, which raises the surface energy and thus enables the optician to perform a reliable edging of the lens. After edging, the temporary coating should be removed so as to restore the external water- and/or oil-repellent coating surface properties. It goes without saying that after removal of the temporary coating, the external water- and/or oil-repellent coating should have surface properties as similar as possible to the initial properties thereof.

While the temporary coatings described in the European patent applications EP 1 392 613 and EP 1 633 684 do result after removal thereof in external water- and/or oil-repellent coatings having good surface properties and a high water static contact angle (typically 112°), this contact angle value shall preferably be further increased.

If needed, after the main edging operation of the optical article, it may be wished to perform a restart of the edging operation and/or a glass drilling, the drilled area acting as a fixing point to a spectacle frame arm.

For these last steps, especially for glass drilling, it is crucial for the clamping device-adhesive holding pad assembly to remain in position on the surface of the article, because it represents a mark enabling the positioning of drills for drilling holes.

The film described in the patent application WO 05/015 270 enables performing the main edging, but it has been systematically observed that the clamping device-adhesive holding pad assembly does spontaneously separate within the few seconds following this main edging operation.

From the very beginning of the edging operation, the water sprayed on the article during this edging operation seems to percolate under the temporary film which does wrap around itself. Under such conditions, it then becomes impossible to perform later a restart of the edging or a glass drilling.

The patent application WO 03/05 7641 considers depositing an organic material onto a $MgF_2$ layer. Therefore, the organic material temporary film is not directly deposited onto the external water- and/or oil-repellent coating.

It is thus an object of the present invention to provide an optical article, especially an ophthalmic lens, comprising an external water- and/or oil-repellent coating directly coated with a temporary coat which:

after removal of the temporary coat, enables to recover an external water- and/or oil-repellent coating having properties that are almost the same as the initial properties thereof and especially a water static contact angle that is almost the same as the initial one; and/or if needed, enables to perform an edging restart operation; and/or enables to perform a glass drilling, the drilled area acting as a fixing point to a spectacle frame arm.

The objectives of the present invention are aimed at herein with an optical article comprising on one of the main surfaces thereof an external water- and/or oil-repellent coating with a low surface energy, characterized in that a temporary coat of a dried polyurethane latex-based composition is directly deposited onto the external water- and/or oil-repellent coating.

The preferably strippable temporary coat generally has a thickness ranging from 10 to 40 μm, preferably from 15 to 30 μm and more preferably from 15 to 20 μm, and preferably has an elongation at break equal to or lower than 200%, more preferably equal to or lower than 150%.

According to the method for depositing the temporary coat, the coat thickness may locally vary. In particular, in the case of a dip coating into a liquid coating composition-containing bath, the thickness is higher in the lower part of the glass (which part contacts the temporary coating composition liquid first and leaves the bath last when lifting the glass).

The temporary coat average thickness results from the measurement of 3 thicknesses performed on 3 points of the surface: a central point and two opposed points: an upper point (around 5 mm from the glass periphery) and a lower point (around 5 mm from the glass periphery), in the case of dip coating.

The average thickness ranges are the same as the hereabove mentioned thickness ranges.

Preferably, the temporary coat has a surface energy higher than or equal to 15 mJ/m$^2$, more preferably higher than or equal to 20 mJ/m$^2$, more preferably higher than or equal to 30 mJ/m$^2$. Even more preferably, the temporary coat has a surface energy polar component lower than 26 mJ/m$^2$.

As used herein, an "optical article" is intended to mean an optically transparent, organic or mineral glass substrate, that has been treated or not depending on whether it comprises one or more coating(s) of various nature or it remains a bare substrate.

Surface energies are calculated according to the OWENS-WENDT method described in the following reference: "Estimation of a surface force energy of polymers", OWENS D. K., WENDT R. G. (1969), J. Appl. POLYM. SCI., 13, 1741-1747.

The optical articles of the invention are optical articles, especially ophthalmic lenses, which comprise an external water- and/or oil-repellent coating, and preferably optical articles comprising an external coating that is a water- and/or oil-repellent external coating deposited onto a mono- or multilayered antireflective coating.

Indeed, external water- and/or oil-repellent coatings are generally applied onto optical articles comprising an antireflective coating, especially composed of a mineral material, so as to reduce their trend towards fouling, for example towards greasy type deposits.

As is known, external water- and/or oil-repellent coatings are obtained by applying, onto the surface of the antireflective coating, compounds reducing the surface energy of the optical article.

Such compounds have been widely described in the previous art, for example in the following U.S. Pat. No. 4,410,563, EP 0 203 730, EP 749 021, EP 844 265, and EP 933 377.

Most of the time, compounds based on silane carrying fluorinated groups, especially perfluorocarbon or perfluoropolyether groups, are used.

Suitable examples thereof include silazane- or polysilazane- or silicone-based compounds comprising one or more fluorinated group(s) such as those previously mentioned.

A known method consists in depositing onto the antireflective coating compounds carrying fluorinated groups and Si—R groups, wherein R represents a —OH group or a precursor thereof, preferably an alkoxy group. Such compounds may cause polymerization and/or cross-linking reactions to occur on the surface of the antireflective coating, immediately upon deposition or after hydrolysis.

Applying the compounds reducing the surface energy of the optical article is traditionally performed by dipping into a compound-based solution, by spin-coating or by conducting a chemical vapor deposition in particular.

Generally, the external water- and/or oil-repellent coating is less than 10 nm thick, and more preferably less than 5 nm thick.

Generally, the external water- and/or oil-repellent coating of low surface energy has a surface energy lower than or equal to 14 mJ/m$^2$, preferably lower than or equal to 13 mJ/m$^2$, more preferably lower than or equal to 12 mJ/m$^2$.

As previously mentioned, the temporary coat of the invention is a dried coat of a polyurethane latex-based composition directly deposited onto the external water- and/or oil-repellent coating.

As is well known, a latex is a dispersion of polymer or copolymer particles in an aqueous medium. Said aqueous medium may be water, for example distilled water or deionized water, or a combination of water and one or more solvent(s), in particular of water and an alkanol, generally a C1 to C6 alkanol, and preferably ethanol.

As used herein, "polyurethane" both includes polyurethane (co)polymers strictly speaking, that is to say polymers that are obtained by condensing at least one polyisocyanate and at least one polyol and optionally a chain extender, and polyurethane-ureas, that is to say (co)polymers obtained by condensing at least one polyisocyanate and one polyamine and optionally a chain extender, as well as mixtures thereof.

Preferably, the polyurethanes and polyurethane-ureas of the invention result from the condensation of a diisocyanate with a diol and/or a diamine. Even more preferably, the polyurethanes and polyurethane-ureas of the invention are aliphatic, linear or cyclic polyurethanes and polyurethane-ureas, that is to say they are obtained by condensing aliphatic, linear or cyclic polyisocyanates with aliphatic, linear or cyclic polyols and/or polyamines.

Polyisocyanates to be suitably used for producing the polyurethanes and polyurethane-ureas of the invention, and especially the preferred diisocyanates, include for example toluene-2,4-diisocyanate, toluene-2,6-diisocyanate, diphenylmethane-4,4'-diisocyanate, diphenylmethane-2,4'-diisocyanate, paraphenylene diisocyanate, biphenyl diisocyanate, 3,3'-dimethyl-4,4'-diphenylene diisocyanate, tetramethylene-1,4-diisocyanate, hexamethylene-1,6-diisocyanate, 2,2,4-trimethylhexane-1,6-diisocyanate, lysinemethylester diisocyanate, bis(isocyanoethyl)fumarate, isophorone diisocyanate (IPDI), ethylene diisocyanate, dodecane-1,12-diisocyanate, cyclobutane-1,3-diisocyanate, cyclohexane-1,3-diisocyanate, cyclohexane-1,4-diisocyanate, methylcyclohexyl diisocyanate, hexahydrotoluene-2,4-diisocyanate, methylcyclohexyl diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, perhydrodiphenylmethane-2,4'-diisocyanate, perhydrophenylmethane-4,4'-diisocyanate (or bis-(4-isocyanatocyclohexyl)-methane or 4,4'-dicyclohexylmethane diisocyanate), and combinations thereof.

The preferred polyisocyanates are aliphatic diisocyanates such as hexamethylene-1,6-diisocyanate, isophorone diisocyanate, ethylene diisocyanate, dodecane-1,12-diisocyanate, cyclohexane-1,3-diisocyanate, bis-(4-isocyanatocyclohexyl)-methane, and combinations thereof. Isophorone diisocyanate is the most preferred diisocyanate.

Other polyisocyanates to be suitably used for the polyurethanes and polyurethane-ureas of the invention are described in detail in WO 98/37 115.

Examples of polyols to be suitably used for the polyurethanes of the invention include pentaerythritol, trimethylol ethane, trimethylol propane, di(triethylol propane) dimethylol propionic acid, ethylene glycol, 1,2- and 1,3-propylene glycol, 1,2-butanediol, 1,4-butenediol, 1,3-butanediol, 2,3-butanediol, 2,2,4-trimethyl-1,3-pentanediol, 1,5-pentanediol, 2,4-pentanediol, 1,6-hexanediol, 2,5-hexanediol, 1,8-octanediol, 2-methyl-1,3-pentanediol, 2,4-heptanediol, 2-ethyl-1,3-hexanediol, 2-methyl-1,3-propanediol, 2,2-dimethyl-1,3-propanediol (neopentyl glycol), 1,4-cyclohexanediol, 2,2-dimethyl-3-hydroxypropyl-2,2-dimethyl-3-hydroxypropionate, 1,2,6-hexanetriol, 1,2,4-butanetriol, glycerol, sorbitol, mannitol, diethylene glycol, triethylene glycol, tetraethylene glycol, dipropylene glycol, tripropylene glycol, dibutylene glycol, 1,4-bis(hydroxymethyl)cyclohexane, 1,2-bis(hydroxymethyl)cyclohexane, 1,2-bis(hydroxyethyl)cyclohexane, bis(hydroxypropyl)allantoins, and tris(hydroxyethyl)isocyanurate.

The preferred polyols are aliphatic diols and especially polypropylene glycol.

Another class of polyols to be suitably used for the polyurethanes and polyurethane-ureas of the invention are polyether polyols such as polyoxyalkylene polyols, polyalkoxylated polyols such as poly(oxytetramethylene)diols, and combinations thereof.

Diamines are the most preferred polyamines, and especially aliphatic, linear and cyclic diamines.

Suitable diamines include diaminomethane, ethylene diamine, 1,2-diaminopropane, 1,3-diaminopropane, 1,4-diaminobutane, 1,6-diaminohexane, 1,4-diaminocyclohexane, 4,4'-diaminodicyclohexylmethane, 1-amino-3-aminomethyl-3,5,5-trimethylcyclohexane and trimethyl amine.

Amino alcohols such as monoethanol amine and diethanol amine may also be suitably used for preparing the polyurethanes and polyurethane-ureas of the invention.

Polyurethanes and their preparation method are described amongst others in the U.S. Pat. No. 6,187,444.

Preferably, the polyurethanes of the invention do not comprise any acrylic or methacrylic function, and especially any polymerizable acrylic or methacrylic function.

The polyurethane latexes to be suitably used in the present invention are commercially available, for example from the BAXENDEN company under the trade names W 234 and W 240 (polyurethane-ureas) or from the SOCOMOR company under the trade name Pellimer TC™ (polyurethane-urea), and from the SYNTRON company under the trade name PROXR 910® (polyurethane).

Pellimer TC will be used thereafter after a water dilution. (A mixture is prepared, composed of 80% by weight of Pellimer TC and 20% by weight of water). The resulting mixture will be thereafter called TC80F.

The polyurethane latex-based compositions of the invention may of course be mixtures of polyurethane latexes, especially of commercially available polyurethane latexes.

In a particular embodiment of the invention, the polyurethane latex-based composition also comprises a small amount, up to 10% by weight of the composition, of a (meth)acrylic type latex, preferably of an acrylic type latex. Preferably, the amount by weight of (meth)acrylic type latex does vary from 0.1 to 10% by weight and more preferably from 2 to 6% by weight of the latex composition total weight.

The amount of acrylic type latex dry matter expressed by weight as related to the composition dry matter total weight does also preferably vary from 0.1 to 10% by weight, and more preferably from 2 to 6% by weight.

As a positive result of the presence of (meth)acrylic type latex, the hydrophilic character of the material is reduced on the one hand, and the final dry coat is made more rigid as well as the elongation at break thereof is reduced on the other hand.

These (meth)acrylic type latexes are commercially available, in particular from the SYNTRON company under the trade names PROXAM 185 RS® (acrylic resin), PROXAM 157® (acrylic copolymer), PROXAM N 360® (acrylic copolymer).

Preferably, the PU-type latex-based compositions of the invention are devoid of mineral or magnesium colloidal particles.

Mineral or magnesium oxide colloids are not required for obtaining the positive results of the invention, especially the adhesive pad adhesion.

Generally, the PU-type latex-based compositions of the invention preferably further comprise one or more surfactant(s) generally in an amount ranging from 0.5 to 10% by weight of the latex composition total weight, preferably from 0.5 to 6% by weight.

Generally, the PU-type latex-based compositions of the invention have a solid content (dry matter) ranging from 25 to 55% by weight, preferably from 25 to 50%, more preferably from 25 to 45% by weight of the latex-based composition total weight.

Their viscosity at room temperature does preferably vary from 5 to 50 cp, and more preferably from 7 to 46 cp.

The temporary coats of the invention may be deposited onto the water- and/or oil-repellent coating by any type of means, but preferably by dip coating, spin coating, spraying, or by using a brush (brush coating), preferably by dip coating.

Depositing may be performed onto the whole surface of the lens side intended to receive the adhesive holding pad or onto part thereof, especially onto the central part of the lens.

In an embodiment, the temporary coat may be applied onto the central part by means of a brush.

Preferably, there will not be any additional coating onto the surface of the temporary coat, i.e. the temporary coat is preferably a monolayer and, upon edging, the adhesive holding pad directly comes into contact with the surface of the polyurethane latex-based temporary coat.

Preferably, the temporary coat is optically inactive, that is to say it enables measuring the power using traditional measuring means such as a frontofocometer.

Once it has been applied, the latex composition of the invention is dried, generally by heating to temperatures typically between 40° C. and 80° C., for a time period ranging from a few minutes to a couple of hours.

The good results of the invention are obtained by simply drying without requiring any actinic radiation.

It is not necessary for the composition to comprise a photopolymerization initiator.

Preferably, the latex composition is dried in a single step, by heating or keeping it at room temperature.

The following examples illustrate the present invention. In the examples, unless otherwise specified, all parts and percentages are expressed on a weight basis.

1. Latex Compositions Used in the Examples

The latex compositions used in the examples are detailed in Table I hereunder.

TABLE I

Latex compositions

| Composition No | Latex (%) PU type | Latex (%) PU-urea type | Latex (%) Acrylic type | Surfactant (%) | Solvent | Dry matter (%) |
|---|---|---|---|---|---|---|
| 1a | — | W234 (99.33%) | — | A (0.67%) | water | 31% |
| 1b | — | W234 (95.24%) | — | M (4.76%) | water | 31.4% |
| 1c | — | W234 (94.57%) | — | A (0.67%) + M (4.76) | water | 31.5% |
| 2a | — | TC80F (100%) | — | — | water | 29% |
| 2b | — | TC80F (99.33%) | — | A (0.67%) | water | 29.5% |
| 2c | — | TC80F (95.24%) | — | M (4.76%) | water | 28.75% |
| 2d | — | TC80F (94.57%) | — | A (0.67%) + M (4.76%) | water | 29.4% |

TABLE I-continued

Latex compositions

| Composition No | Latex (%) PU type | PU-urea type | Acrylic type | Surfactant (%) | Solvent | Dry matter (%) |
|---|---|---|---|---|---|---|
| 3a | PROX R910 (100%) | — | — | — | water | 40% |
| 3b | PROX R910 (99.33%) | — | — | A (0.67%) | water | 39.8% |
| 3c | PROX R910 (95.24%) | — | — | M (4.76%) | water | 39.96% |
| 3d | PROX R910 (94.57%) | — | — | A (0.67%) + M (4.76%) | water | 40.51% |
| 4a | — | — | PROXAM 185 RS (100%) | — | water | 50% |
| 4b | — | — | PROXAM 185 RS (99.43%) | A (0.67%) | water | 49.72% |
| 4c | — | — | PROXAM 185 RS (95.24%) | M (4.76%) | water | 49.61% |
| 4d | — | — | PROXAM 185 RS (94.57%) | A (0.67%) + M (4.76%) | water | 49.2% |
| 5 | — | — | PROXAM 157 (100%) | — | water | 49.73% |
| 6 | — | — | PROXAM N 360 R (100%) | — | water | 45.62% |
| 7 | PROX R910 (94.6%) | — | PROXAM 185 RS (4.7%) | A (0.7%) | water | 40.5% |
| 8 | PROX R910 (91.05%) | — | PROXAM 185 RS (3.5%) | A (0.67%) + M (4.76%) | water | 41% |

A = ACTIRON F 487 ® - biodegradable surfactant (SYNTRON)
M = MODAREZ PW 336 ® - acrylic copolymer-based surfactant (SYNTRON)

The values put in brackets in Table I do correspond to the amounts of the liquid components used (liquid latex, surfactant, . . . ).

The total amount of dry matter in the resulting compositions and in the raw products is given in the right column of Table I.

2. Preparation of the Latex Compositions No 7 and 8

The weighted amount of PROX R 910® is placed in a beaker to which are successively added the weighted amounts of PROX AM 185 RS®, ACTIRON F 487® and optionally MODAREZ PW 336®, and thereafter the mixture is stirred using a RAYNERIE (deflocculating turbine of 35 mm diameter), starting at a low speed then accelerating gradually up to 1 800 rpm, and thereafter stirring is continued for about 2½ hours.

The mixture is left to stand overnight (microbubble removal) prior to being used.

3. Determination of the Surface Energy Characteristics of the Dried Latex Composition Temporary Coats Sample Preparation The latex compositions are deposited by dip coating onto a biplane, base 6, bare substrate made of a diethylene glycol-bis allyl carbonate copolymer (CR 39® from the PPG company—ORMA® from the ESSILOR company) by using a dip coating apparatus with a dewetting rate of 1 mm/s and a waiting time of 10 seconds. The coated samples are then dried in an oven at 50° C. for 2 hours.

Determination of the Surface Energy Characteristics

The characteristics such as the surface energy, the total energy, the dispersive component and the polar component are determined by means of the OWENS-WENDT method using a DIGIDROP GBX apparatus.

For comparative purposes, the surface energy characteristics for two water- and/or oil-repellent coatings are also given, respectively OPTOOL DSX® from the DAIKIN company and KY 130 from the SHINETSU company.

The results are indicated in Table II hereunder.

TABLE II

| Coat nature | Thickness (µm) | Surface energy (mJ/m$^2$) | | |
|---|---|---|---|---|
| | | Total energy | Dispersive component | Polar component |
| 1a | | 39.7 | 34.3 | 5.4 |
| 1b | | 37.6 | 35.5 | 2.1 |

TABLE II-continued

| Coat nature | Thickness (µm) | Surface energy (mJ/m$^2$) | | |
|---|---|---|---|---|
| | | Total energy | Dispersive component | Polar component |
| 1c | | 38.1 | 34.8 | 3.3 |
| 2a | 19 | 43.6 | 34.0 | 9.5 |
| 2b | | 44.2 | 35.6 | 8.6 |
| 2c | | 43.6 | 35.8 | 7.8 |
| 2d | | 39.0 | 28.0 | 10.9 |
| 3a | | 43.4 | 34.5 | 8.9 |
| 3b | | 39.8 | 37.2 | 2.6 |
| 3c | | 37.5 | 33.7 | 3.8 |
| 3d | | 36.4 | 32.4 | 4.0 |
| 4a | | — | — | — |
| 4b | | — | — | — |
| 4c | | 41.3 | 32.6 | 8.7 |
| 4d | | 47.1 | 26.8 | 20.3 |
| 5 | | 36.8 | 34.8 | 2.0 |
| 6 | | 40.9 | 33.1 | 7.8 |
| 7 | | 40.5 | 33.3 | 7.2 |
| 8 | 19 | 43.5 | 31.6 | 12.1 |
| OPTOOL DSX | 2.6 nm | 11.3 | 11.1 | 0.2 |
| KY130 | | 13.1 | 13.0 | 1.0 |

EXAMPLES 1 TO 10 AND COMPARATIVE EXAMPLES C1 TO C6

Temporary coats were formed as previously described on:

an ORMA® substrate (sphere: −5.00, cylinder: +2.00, 65 mm diameter and 1.9 mm centre thickness), a polycarbonate substrate (sphere: −8.00, cylinder: +2.00, 65 mm diameter and 1.3 mm centre thickness), an ORMIX® 1.6 substrate (sphere: −8.00, cylinder: +2.00, 65 mm diameter and 1.1 mm centre thickness), beforehand coated, in the given order, with an abrasion-resistant coating, an antireflective coating and an external water- and/or oil-repellent coating (OPTOOL DSX, 2.6 nm thickness) as described in example 1 of the European patent EP 1 392 613. The formation of the temporary coat was visually controlled and edging and drilling tests were performed on the samples. The temporary coat characteristics and the results are indicated in Table III.

Offset Measuring Procedure for Lenses Submitted to an Edging Operation

I—Test Description

The edging test is performed on an Essilor Kappa grinder. Lenses are edged so as to provide the same with a specific frame template shape (see hereunder).

The following equipment is required for the test to be performed:

An Essilor CLE 60 frontofocometer (for glass pointing and final inspection).
Essilor Kappa digital equipment (tracer-blocker-grinder).
Frame template of the Charmant type reference 8320, model 05, size 51.
Pseudo frame for control.
Adhesive dot or adhesive holding pad LEAP II, 24 mm diameter, GAM200, from the 3M company.
Essilor clamping device for receiving the adhesive dot.

II—Sampling and Mounting Parameters

The retained mounting dimensions are as follows:
Height: Half-height boxing i.e.
PD (right and left)=32 mm and axis=90°

The trimming cycle used is a cycle adapted to the material (plastic cycle for low index, polycarbonate cycle for PC, and cycle for substrates having a mean refractive index MHI). The retained clamping pressure is the brittle glass pressure option of the grinder.

III—Controls

After edging, controls are performed so as to determine whether the edging operation has been successful.

Controls are performed using the frontofocometer CLE 60 by pointing the lenses held in the pseudo-frame. Axes are registered during this phase.

If the lens, after the edging operation, cannot be inserted into the pseudo-frame, or if the lens can be inserted into the pseudo-frame, but with an offset of more than 2°, the lens is non-compliant and did not pass the test successfully. It is noted "-" in the result table.

If the glass offset is lower than 2°, the lens passes the test successfully and is noted "X" in the result table.

Drilling after Edging

After the edging operation, the lens and clamping device/adhesive pad assembly, with the clamping device/adhesive pad firmly adhering to the lens, is placed in an Optodrill or Minima2 drilling machine and held in position by a blocking device.

The lens is then drilled:
either manually with the Minima 2 drilling machine provided with a drill of 2.2 mm diameter, rotating at 3500 rpm,
or automatically with the Optidrill Evo drilling machine provided with a drill of 2.2 mm diameter, rotating at 12000 rpm.

After drilling, the blocking system is unlocked and the drilled lens is recovered together with the clamping device/adhesive pad assembly.

Then the clamping device is removed and the drilled lens is recovered.

When the lens can be positioned in the drilling device and therefore passes the drilling operation successfully, it is noted "X" in Table III. If not, it is noted "-".

For the lenses of examples 1 to 8 and C1 to C6, the adhesive pad has lost its adhesiveness after the edging operation and does not enable drilling.

For the lenses of examples 9 and 10, the adhesive pad remains firmly in place on the lens after the edging operation and makes it possible to position the lens in the drilling device and to perform a proper drilling.

TABLE III

| Ex No | Temporary coat Latex-based composition | Thickness (µm) | Film formation | Single edging | Total edging | Drilling after total edging |
|---|---|---|---|---|---|---|
| 1 | 2a | 19 | X | X | — | — |
| 2 | 2b |  | X | X | — | — |
| 3 | 2c |  | X | X | — | — |
| 4 | 2d |  | X | X | — | — |
| 5 | 3a |  | X | X | — | — |
| 6 | 3b |  | X | X | X |  |
| 7 | 3c |  | X | X | X |  |
| 8 | 3d |  | X | X | X |  |
| 9 | 7 |  | X | X | X | X |
| 10 | 8 | 19 | X | X | X | X |
| C1 | 4a |  | — | — | — | — |
| C2 | 4b |  | — | — | — | — |
| C3 | 4c |  | — | — | — | — |
| C4 | 4d |  | — | — | — | — |
| C5 | 5 |  | — | — | — | — |
| C6 | 6 |  | — | — | — | — |

"X" = yes
"—" = no

The water contact angle of the external water- and/or oil-repellent coating of the sample of example 8 was also measured after removal of the temporary coat, and compared to the value of such a contact angle for the same water- and/or oil-repellent coating prior to depositing the temporary coat. As a comparison, measuring the water contact angle has also been performed for a commercial product Platinum® (substrate with a refractive index 1.56) from the HANDOK OPTEC company.

Measurements were repeated after having treated the water- and/or oil-repellent coating with caustic soda.

The results are given in Table IV

TABLE IV

| | Nature of the water- and/or oil-repellent coating/temporary coat removed | Water contact angle (°) | |
|---|---|---|---|
| | | Without any caustic soda treatment | After a caustic soda treatment |
| EX 11 (invention) | OPTOOL DSX 2.6 nm/Latex No 8 (example 10) | 117°-120° | 114°-115° |
| Ref. 1 | OPTOOL DSX ~3 nm | 117°-120° | 113° |
| Ref. 2 | KY 130 | 110° | 109° |
| Comparative 1 | Platinum ® | 111° | — |

Measuring the contact angle is performed by means of a goniometer KRÜSS, reference DSA 10, by depositing 5 droplets of deionized water (4 µl per droplet) onto the cleaned and dried surface of the lens, one on the centre thereof and the four others 20 mm away from the latter.

The caustic soda treatment which is intended to check the water- and/or oil-repellent coating resistance consists in dipping the lens for 1 minute into a soda solution 0.1N, then in rinsing with water and isopropyl alcohol, drying, measuring the contact angles, dipping again for 29 minutes in the soda solution 0.1N, rinsing and drying again and measuring the contact angles. The contact angle value does correspond to the average of these results.

The glass is considered as having successfully passed the caustic soda treatment when the contact angle mean values without any soda treatment and after a soda treatment are close to the target values as defined hereunder:

| Nature of the water- and/or oil-repellent coating/temporary coat removed | "Water contact angle" (°) target values | |
|---|---|---|
| | Without any caustic soda treatment | After a caustic soda treatment |
| OPTOOL DSX ~3 nm | 117°-120° | 113°-114° |
| KY 130 (20 nm set value) | 110° | 109° |

It is an advantage of the temporary coating of the invention to enable a wet deposition, to enable a glass marking out on the temporary coat, to preserve the low surface energy of the water- and/or oil-repellent coating, especially to better preserve the water contact angle after removal of the temporary coating and thus to be versatile, that is to say able to be deposited onto various water- and/or oil-repellent coats.

The invention claimed is:

1. An optical article comprising on one of the main surfaces thereof an external water- and/or oil-repellent coating, wherein a temporary coat of a dried polyurethane latex-based composition has been directly deposited onto the external water- and/or oil-repellent coating.

2. The optical article of claim 1, wherein the external water- and/or oil-repellent coating has a surface energy lower than or equal to 14 mJ/m$^2$.

3. The optical article of claim 2, wherein the external water- and/or oil-repellent coating has a surface energy lower than or equal to 12 mJ/m$^2$.

4. The optical article of claim 1, wherein the temporary coat has a surface energy higher than or equal to 15 mJ/m$^2$.

5. The optical article of claim 4, wherein the temporary coat has a surface energy higher than or equal to 30 mJ/m$^2$.

6. The optical article of claim 4, wherein the temporary coat has a surface energy polar component lower than 26 mJ/m$^2$.

7. The optical article of claim 1, wherein the temporary coat has a thickness of 10 to 40 μm.

8. The optical article of claim 1, wherein the temporary coat has a thickness of 15 to 20 μm.

9. The optical article of claim 1, wherein the temporary coat has an elongation at break equal to or lower than 200%.

10. The optical article of claim 9, wherein the temporary coat has an elongation at break equal to or lower than 150%.

11. The optical article of claim 1, wherein the polyurethane latex-based composition comprises at least one polyurethane latex and at least one poly(meth)acrylic latex.

12. The optical article of claim 11, wherein the poly(meth)acrylic latex is a polyacrylic latex.

13. The optical article of claim 11, wherein the polyurethane latex-based composition comprises 0.1 to 10% by weight of a polyacrylic latex.

14. The optical article of claim 13, wherein the polyurethane latex-based composition comprises 2 to 6% by weight of a polyacrylic latex.

15. The optical article of claim 1, wherein the polyurethane latex-based composition has a solid content of 25 to 55% by weight of the latex-based composition total weight.

16. The optical article of claim 15, wherein the polyurethane latex-based composition has a solid content of 25 to 45% by weight of the latex-based composition total weight.

17. The optical article of claim 1, wherein the polyurethane latex-based composition comprises at least one surfactant.

18. The optical article of claim 17, wherein the surfactant(s) are from 0.5 to 10% by weight of the polyurethane latex-based composition total weight.

19. The optical article of claim 1, wherein the temporary coat is a strippable film.

20. The optical article of claim 1, wherein the external water- and/or oil-repellent coating is deposited onto a mono- or multilayered antireflective coating.

21. The optical article of claim 1, further defined as an ophthalmic lens.

* * * * *